M. A. MARKEL.
BALING PRESS.
APPLICATION FILED APR. 15, 1909.
935,531.
Patented Sept. 28, 1909.
2 SHEETS—SHEET 1.
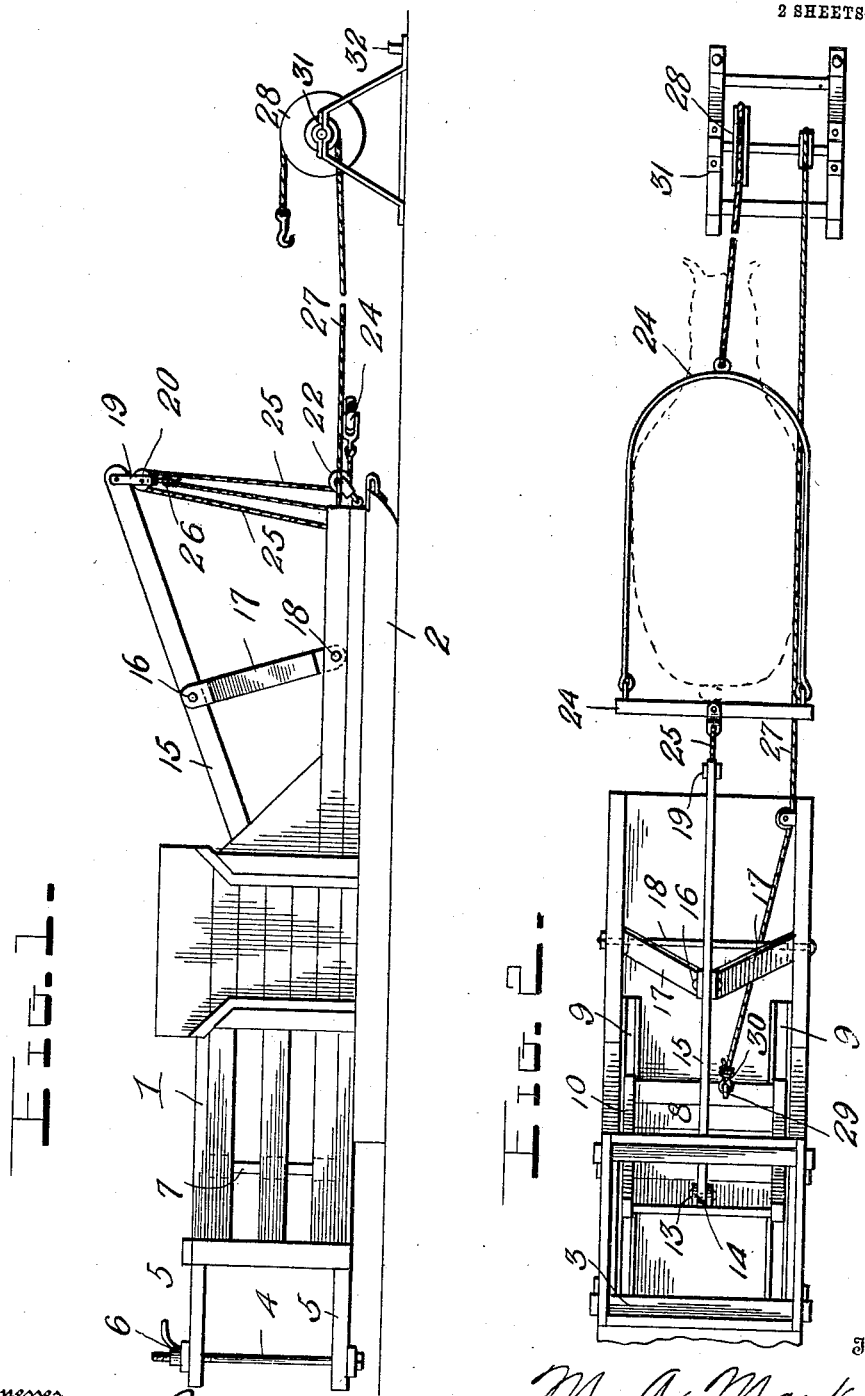
Witnesses
Chas. L. Griesbauer,
E. M. Ricketts
Inventor
M. A. Markel
By Watson E. Coleman
Attorney

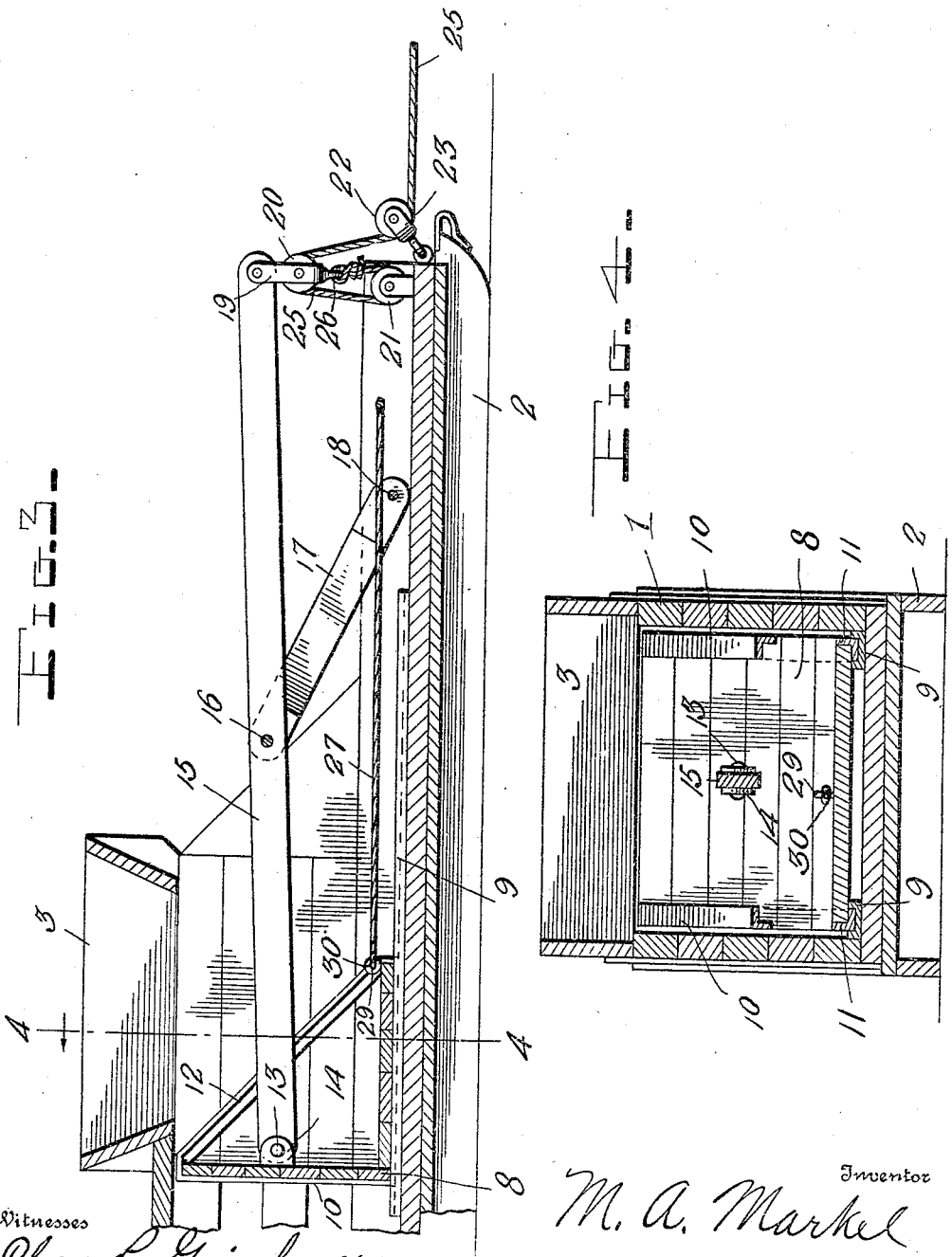

UNITED STATES PATENT OFFICE.

MORTIMER A. MARKEL, OF NEWTOWN, MISSOURI.

BALING-PRESS.

935,531.  Specification of Letters Patent.  Patented Sept. 28, 1909.

Application filed April 15, 1909. Serial No. 490,067.

*To all whom it may concern:*

Be it known that I, MORTIMER A. MARKEL, a citizen of the United States, residing at Newtown, in the county of Sullivan and State of Missouri, have invented certain new and useful Improvements in Baling-Presses, of which the following is a specification, reference being had to the accompanying drawings.

This invention relates to presses for baling hay and the like.

The object of the invention is to provide a simple and practical baling press with improved means for reciprocating its plunger.

With the above and other objects in view the invention consists in the novel construction, combination and arrangement of parts hereinafter fully described and claimed, and illustrated in the accompanying drawings, in which—

Figure 1 is a side elevation of the improved baling press, Fig. 2 is a plan view, Fig. 3 is a detail longitudinal section, and Fig. 4 is a transverse section taken on the plane indicated by the line 4—4 in Fig. 3.

Referring to the drawings by numeral 1 denotes the body of the press which contains the baling chamber and which is preferably mounted on two sled runners 2 so that it may be readily transported. At the top of one end of the body 1 is a hopper 3 into which the hay or other material to be baled is deposited; and at the other end of the press body is provided means for adjusting the size of the bale chamber to vary the density of the bale formed therein. This adjusting means, shown more clearly in Fig. 1, consists in providing upright tie rods or bolts 4 between the upper and lower beams 5 of the body so that when the wing nuts 6 upon the upper ends of the rods 4 are tightened the top and bottom portions of the press will be sprung together to reduce the size of the baling chamber. The usual division blocks 7 are used in the bale chamber for separating the bales and permitting them to be readily wired.

Mounted for reciprocation in the bale chamber and beneath the hopper 3 is a plunger 8 adapted to be supported and guided by two track bars 9 of U-shape in cross section secured to the bottom of the baling chamber as shown more clearly in Figs. 3 and 4 of the drawings. The plunger 8 consists of two triangular end frames formed from single pieces of angle metal and each having upright portions 10, bottom portions 11 which latter slide in the channeled track bars 9, and inclined portions 12. These angle metal end frames are united by boards which form the body of the plunger. Pivoted by means of a pin 13 between spaced brackets 14 arranged centrally on the upright portion of the plunger is a longitudinally extending plunger rod 15 adapted to have vertical swinging movement as well as longitudinal reciprocatory movement. The intermediate portion of the rod 15 is pivoted at 16 between the converging upper ends of two toggle links 17, the diverging lower ends of which are pivoted at 18 between the side bars or beams of the body 1 of the press. The extreme rear or outer end of the plunger rod 15 has pivotally secured to it a U-shaped hanger or pulley block 19 containing a pulley or other guide 20. A similar guide pulley 21 is journaled upon the bottom of the body 1 adjacent to its outer or rear end and a third guide pulley 22 is journaled in a pivotally mounted block 23 arranged upon the same end of the body 1 of the press. The plunger rod is actuated by a horse or draft animal hitched to a draft device 24 the swingletree of which is connected to one end of a cable 25. This cable extends around the guide pulley 22 then up over the guide pulley 20 and then down and around the guide pulley 21 and has its other end attached to an eye 26 on the lower end of the block or hanger 19 as clearly shown in Fig. 3 of the drawings. The neck yoke or other portion of the draft device 24 is connected to one end of another cable 27 which after passing one or more times around a pulley or drum 28 has its other end attached at 30 to the bottom portion of the plunger 8. The pulley or drum 28 is journaled in bearings on a suitable stand or frame 31 arranged in longitudinal alinement with the body of the press and at a suitable distance therefrom said frame or stand being secured stationary by means of stakes 32 or equivalent anchoring devices.

In operation it will be seen that when the horse is adjacent to the press and is driven in the direction of the pulley stand or frame 31 that the cable 25 will be drawn upon to cause the upper rear end of the plunger rod 15 to be lowered and owing to its connection with the links 17 said plunger rod as it is lowered will be moved longitudinally in a forward direction to force the plunger 8 into the baling chamber as will be seen upon reference to Fig. 3 of the drawings. When the horse or draft animal is backed the cable 27 will be drawn upon to retract the plunger 8 and the latter in being retracted will cause the plunger rod 15 to return to its normal elevated position shown in Fig. 1.

Having thus described the invention, what is claimed is:

1. A baling press comprising a body having a baling chamber, a reciprocatory plunger therein, a vertical swinging rod pivoted to the plunger, links connecting the intermediate portion of the plunger rod to the body of the press, a draft device consisting of a swingletree, and a continuous trace attached at its ends to the swingletree, a suitably supported shaft, large and small pulleys upon said shaft, a cable attached to and wound upon the large pulley and having its free end connected to the double trace of the draft device, a second cable attached to and wound upon the small pulley and having its other end connected to the plunger, guide pulleys, and a third cable engaged with said guide pulleys and having one end connected to the swingletree of the draft device and its other end anchored, one of the last mentioned pulleys being mounted on the free end of the plunger rod substantially as and for the purpose specified.

2. A baling press comprising a body having a baling chamber, channeled guide tracks on the bottom thereof, a plunger consisting of triangular end frames constructed of angle metal and boards connecting said end frames, the bottom portions of said end frames being slidable in the guide tracks, and means for actuating the plunger.

In testimony whereof I hereunto affix my signature in the presence of two witnesses.

MORTIMER A. MARKEL.

Witnesses:
   ROBERT W. LEWIS,
   MONROE F. BLACK.